(12) United States Patent
Lynema et al.

(10) Patent No.: US 11,772,560 B2
(45) Date of Patent: Oct. 3, 2023

(54) TRAILER BACK-UP SYSTEM

(71) Applicant: MasterCraft Boat Company, LLC, Vonore, TN (US)

(72) Inventors: Chad A. Lynema, Knoxville, TN (US); Ryan D. Lake, Madisonville, TN (US); Eric Wayne Stoner, Greenback, TN (US)

(73) Assignee: MasterCraft Boat Company, LLC, Vonore, TN (US)

( * ) Notice: Subject to any disclaimer, the term of this patent is extended or adjusted under 35 U.S.C. 154(b) by 0 days.

(21) Appl. No.: 17/692,744

(22) Filed: Mar. 11, 2022

(65) Prior Publication Data

US 2022/0363195 A1 Nov. 17, 2022

Related U.S. Application Data

(60) Provisional application No. 63/183,327, filed on May 3, 2021.

(51) Int. Cl.
*B60R 1/23* (2022.01)
*B60P 3/10* (2006.01)

(52) U.S. Cl.
CPC .............. *B60R 1/23* (2022.01); *B60P 3/1033* (2013.01); *B60R 2300/105* (2013.01); *B60R 2300/106* (2013.01); *B60R 2300/808* (2013.01)

(58) Field of Classification Search
None
See application file for complete search history.

(56) References Cited

U.S. PATENT DOCUMENTS

| | | | |
|---|---|---|---|
| 5,027,200 | A | 6/1991 | Petrossian et al. |
| 6,222,447 | B1 | 4/2001 | Schofield et al. |
| 6,970,184 | B2 | 11/2005 | Hirama et al. |
| 7,139,412 | B2 | 11/2006 | Kato et al. |

(Continued)

FOREIGN PATENT DOCUMENTS

| | | |
|---|---|---|
| DE | 102015001359 A1 | 8/2015 |
| WO | 96/38319 | 12/1996 |

OTHER PUBLICATIONS

"Recommended Backup Camera System to Mount On back Of Boat Trailer" https://www.etrailer.com/question-124453.html (Accessed Mar. 1, 2016).

(Continued)

*Primary Examiner* — Rebecca A Volentine
(74) *Attorney, Agent, or Firm* — Venable LLP

(57) ABSTRACT

A boat trailer and a method of backing up a boat on a trailer. The boat trailer includes a trailer back-up system having a first image capture device, a second image capture device, and a transmitter. The first image capture device is mounted on a left guide pole of the trailer in a rear-facing direction, and the second image capture device is mounted on a right guide pole of the trailer in a rear-facing direction. The transmitter is in communication with each of the first image capture device and the second image capture device and configured to transmit live video images from the first image capture device and from the second image capture device to a display device. The method includes moving the trailer with a boat loaded on the trailer in a rearward direction and capturing, in real-time, a first view and a second view.

20 Claims, 10 Drawing Sheets

(56) References Cited

U.S. PATENT DOCUMENTS

| | | |
|---|---|---|
| 7,859,565 B2 | 12/2010 | Schofield et al. |
| 7,982,768 B2 | 7/2011 | Chien et al. |
| 9,085,261 B2 | 7/2015 | Lu et al. |
| 9,131,120 B2 | 9/2015 | Schofield et al. |
| 9,154,746 B2 | 10/2015 | Kageta |
| 9,227,568 B1* | 1/2016 | Hubbell .............. G02B 5/09 |
| 9,242,602 B2 | 1/2016 | Corcoran et al. |
| 9,904,293 B1 | 2/2018 | Heap et al. |
| 10,372,976 B2 | 8/2019 | Kollmann et al. |
| 2011/0123304 A1* | 5/2011 | Thomas .............. B60P 3/122 |
| | | 254/323 |
| 2014/0085472 A1 | 3/2014 | Lu et al. |
| 2014/0160276 A1 | 6/2014 | Pliefke et al. |
| 2014/0340516 A1 | 11/2014 | Vojtisek et al. |
| 2014/0354811 A1 | 12/2014 | Weber |
| 2015/0217693 A1 | 8/2015 | Pliefke et al. |
| 2016/0050356 A1* | 2/2016 | Nalepka .............. H04N 23/62 |
| | | 348/148 |
| 2019/0217888 A1* | 7/2019 | Perry .............. B62D 15/028 |
| 2021/0031668 A1* | 2/2021 | French .............. B62D 21/20 |
| 2021/0206329 A1* | 7/2021 | Hamlin .............. H04N 23/51 |
| 2022/0180488 A1* | 6/2022 | Nakagawa .............. B60R 1/27 |

OTHER PUBLICATIONS

"Mirror-View-Ir-2+1 Trailer Camera Set" http://store.visorview.com/v-v-mirror-view-ir-21dualcameratrailersystem.aspx (Accessed Feb. 26, 2016).

"Agriculture 7" Quad Monitor Rear View Backup System Side View Camera http://www.aliexpress.com/item/Agriculture-7-Quad-Monitor-Rear-View-Backup-System-Side-View-Camera-Wholesale/679984250.html?spm=2114.01010208.3.79.dLGT24&ws_ab_test=searchweb201556_7,(Accessed Feb. 26, 2016).

Voyager Vision WVOS2TX Installation and Operation Manual, ASA Electronics, Sep. 15, 2020.

* cited by examiner

TRAILER BACK-UP SYSTEM

CROSS-REFERENCE TO RELATED APPLICATIONS

This application claims the benefit under 35 U.S.C. § 119(e) of U.S. Provisional Patent Application No. 63/183,327, filed May 3, 2021, and titled "TRAILER BACK-UP SYSTEM," the entirety of which is incorporated herein by reference.

FIELD OF THE INVENTION

This invention relates to systems and methods for aiding in backing up a trailer, particularly a boat trailer.

BACKGROUND OF THE INVENTION

Backing up a boat trailer is required frequently in boating. For instance, a boat trailer is often backed up to launch a boat into a body of water or to park the trailer and boat in a garage or parking space. Whether backing the trailer and boat down a ramp or into a parking space, the environment around the boat is often crowded. To safely back up the trailer and boat, one must be able to see the sides of the boat and the rear corners of the boat and to monitor the relationship between the sides and rear of the boat, the boat trailer, and any obstacles in the environment.

Traditional camera systems mounted on vehicles for assisting in backing up a vehicle or trailer are mounted at the rear-most portion of the vehicle or trailer. Such systems only offer the driver a view of the environment immediately behind the vehicle or trailer. They are not positioned to provide the driver with a view of the sides of the boat and the rear corners of the boat relative to the environment. As such, these systems fail to provide the driver the ability to monitor the relationship between the boat, particularly the sides and corners of the boat, the boat trailer, and any obstacles in the environment. In addition, the stern of the boat may be cantilevered off the back of the trailer and thus the boat may obscure portions of the environment behind the boat. Also, during transport on the trailer, the boat hull may obscure a large portion of the field of view, thus adding to the difficulties encountered when transporting the boat.

Embodiments of the invention relate to systems and methods for aiding in the backing up of a boat and trailer and relieving the issues discussed above. More specifically, embodiments of the invention allow a user (driver) to see the sides of the boat and the rear corners of the boat. Such a view enables the user (driver) to monitor the relationship between the sides and rear of the boat, the boat trailer, and any obstacles in the environment.

SUMMARY OF THE INVENTION

In one aspect, the invention relates to a boat trailer including a frame, a left guide pole, a right guide pole, and a trailer back-up system. The frame includes a front portion and a rear portion. The rear portion has a rear left portion and a rear right portion. The left guide pole extends in a generally vertical direction and is disposed on the rear left portion of the frame. The right guide pole extends in a generally vertical direction and is disposed on the rear right portion of the frame. The trailer back-up system includes a first image capture device, a second image capture device, and a transmitter. The first image capture device is mounted on the left guide pole of the trailer in a rear-facing direction. The second image capture device is mounted on the right guide pole of the trailer in a rear-facing direction. The transmitter is mounted on the frame of the trailer and in communication with each of the first image capture device and the second image capture device. The transmitter is configured to transmit live video images from the first image capture device and from the second image capture device to a display device.

In another aspect, the invention relates to a method of backing up a boat on a trailer. The method includes a step of moving the trailer with a boat loaded on the trailer in a rearward direction. The method also includes capturing, in real-time, a first view and a second view. The first view includes (i) at least a rear portion of a left side of the boat, (ii) at least an area adjacent to the left portion of the left side of the boat, and (iii) an environment behind a left, rear corner of the boat. The second view includes (i) at least a rear portion of a right side of the boat, (ii) at least an area adjacent to the rear portion of the right side of the boat, and (iii) an environment behind a right, rear corner of the boat. The method also includes a step of displaying on a display at least one of the first view and the second view in real-time.

These and other aspects of the invention will become apparent from the following disclosure.

DETAILED DESCRIPTION OF THE PREFERRED EMBODIMENTS

As used herein, directional terms forward (fore), aft, inboard, outboard, port, starboard, bow, stern, and the like have their commonly understood meaning in the art. Relative to the boat, forward is a direction towards the bow, and aft is a direction towards the stern. Likewise, inboard is a direction toward the center of the boat and outboard is a direction away from it.

Preferred embodiments include a boat trailer having a frame. A left guide pole is positioned on a rear left portion of the frame and extends in a generally vertical direction. A right guide pole is positioned on a rear right portion of the frame and extends in a generally vertical direction. As used herein, the term "generally vertical" is intended to include directions that are not perpendicular to a horizontal surface of the trailer, and includes angles, for example, between 45 degrees to 135 degrees to the horizontal surface of the trailer. Preferred embodiments further include a trailer back-up system with a first image capture device mounted on the left guide pole of the trailer in a rear-facing direction and a second image capture device mounted on the right guide pole of the trailer in a rear-facing direction. In some embodiments, the trailer back-up system includes a transmitter mounted on the frame of the trailer to transmit live video images from the first and second image capture devices to a display device.

Figure 1:
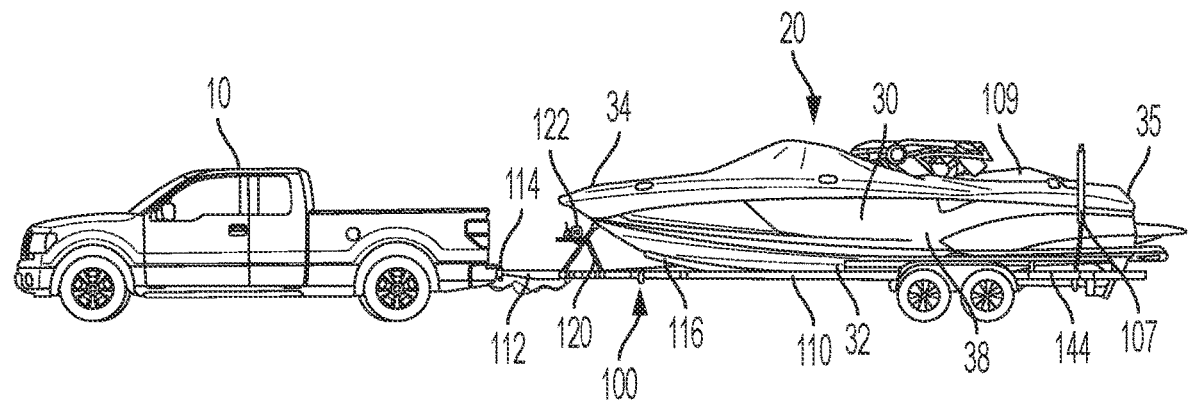
FIG. 1 shows a vehicle hitched to a trailer for towing a boat with a boat loaded on the boat trailer.
Figure 2:
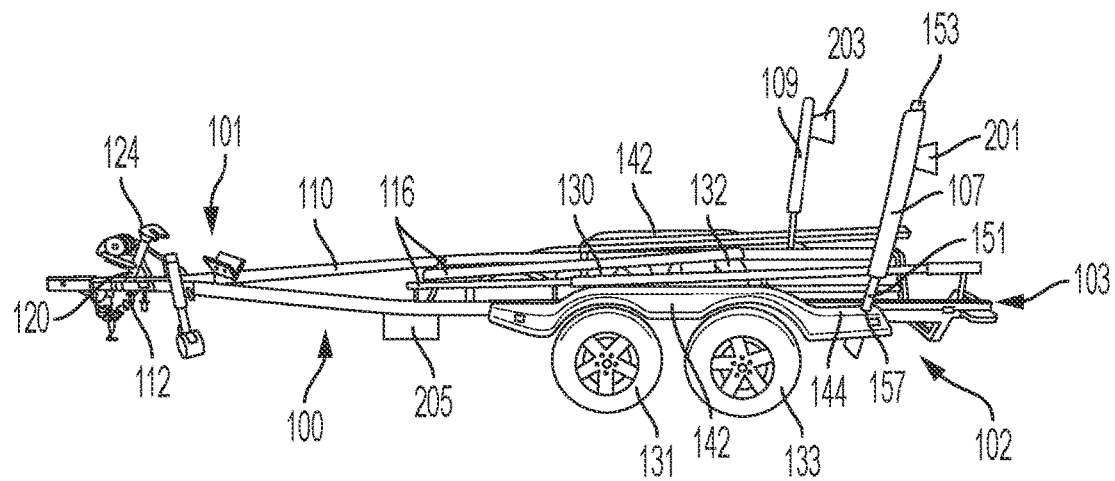
FIG. 2 shows the boat trailer shown in FIG. 1 equipped with a trailer back-up system according to an embodiment of the invention.

FIGS. 1 and 2 show a trailer 100 that may be equipped with a trailer back-up system 200 according to preferred embodiments discussed herein. In preferred embodiments, the trailer 100 is configured to tow a boat 20. FIG. 1 shows the trailer 100 hitched to a vehicle 10. The trailer 100 is shown in FIG. 1 with the boat 20 loaded on the trailer, and the trailer 100 is shown in FIG. 2 without the boat 20. In one exemplary embodiment, the trailer 100 is an unpowered vehicle configured for movement over land that is towed by a motorized vehicle 10. The motorized vehicle 10 also is configured for movement over land and includes, for example, the pickup truck shown in FIG. 1 or other suitable cars, trucks, tractors, and the like. The boat 20 may include a hull 30 having a hull bottom 32, a bow 34, a stern 35, a starboard side 36 (see FIG. 8), and a port side 38. The boat 20 shown in the figures is a single hull boat, but the boat 20 may be any suitable boat including multi-hull boats such as pontoons. Thus, the references to the starboard side 36 and the port side 38 of the hull 20 may be applied to the starboard side 36 and the port side 38 of the boat 20, generally.

The trailer 100 includes a front portion 101 and a rear portion 102. In the embodiments shown herein, the boat 20 is described as being loaded onto the trailer with the bow 34 being located at the front portion of the 101 of the trailer 100 and the stern 35 being located at the rear portion 102 of the trailer 100, but other orientations may be used such as the bow 34 being located at the rear portion 102 of the trailer 100 and the stern 35 being located at the front portion of the 101 of the trailer 100. As used herein, the left side of the trailer 100 refers to the side of the trailer 100 on the left when facing the front portion 101 of the trailer 100 from a position on the rear portion 102 of the trailer 100 or a position behind the rear portion 102 of the trailer 100, and the right side of the trailer refers to the side of the trailer on the right when facing the front portion 101 of the trailer 100 from a position on the rear portion 102 of the trailer 100 or a position behind the rear portion 102 of the trailer 100. The trailer 100 also includes a rear-most end 103. These directions may also apply to the orientation of the boat 20 when located on the trailer 100.

The trailer 100 has a frame 110 with a tongue 112 on the front portion 101 of the trailer 100. The tongue 112 includes a coupler 114 used to hitch the trailer 100 to the vehicle 10. Any suitable coupler 114 may be used including, for example, a coupler that is configured to engage with a ball on the rear of the vehicle 10. The trailer 100 also includes a plurality of boat supports attached to the frame 110 and configured to support the boat 20 when loaded on the trailer 100. In this embodiment, the supports are a plurality of bunks 116, but any suitable boat support may be used including, for example, rollers. The hull bottom 32 of the boat 20 rests on the bunks 116.

The trailer 100 also includes a winch post 120 positioned on the front portion 101 of the frame 110. A bottom end portion of the winch post 120 is connected to the frame 110 and a winch 122 is attached to a top end portion of the winch post 120. The winch 122 may include a cable and a hook that can be attached to a ring on the bow 34 of the boat 20 to pull the boat 20 onto the trailer 100 during loading and to secure the boat 20 on the trailer 100 once loaded. A boat stop 124 also may be attached to top end portion of the winch post 120. When fully loaded onto the trailer 100, the bow 34 of the boat 20 may contact the boat stop 124.

The trailer 100 includes at least one pair of tires 130, 131, with one tire 130 on the left side of the trailer and one tire 131 on the right side of the trailer. In the depicted embodiment, the trailer includes two pairs of tires 130, 131, 132, 133, with two tires on each side of the trailer, but the invention discussed herein may be used with trailers having any suitable number of tires. In this embodiment, the trailer 100 also includes a fender 142 attached to the frame 110 and positioned over the tires 130, 131, 132, 133 on each side (left and right side) of the trailer 100. A step 144 is also formed between the fender 142 and the rear-most end 103 of the trailer 100 on each side of the frame 110. The step 144 may be integrally formed with the fender 142 and attached to the frame 110 by any suitable mechanism, such as welds and bolts, for example. The step 144 may extend from the fender 142 towards the rear-most end 103 of the trailer 100. The step 144 may extend part way to the rear-most end 103 of the trailer 100, such that the step 144 has an end located between the fender 142 and the rear-most end 103 of the trailer 100, or may extend to the rear-most end 103 of the trailer 100. In this embodiment, the step 144 may be considered a generally horizontal surface that is sized to allow a person to place at least one foot thereon. The step 144 should be capable of at least supporting a human and preferably is capable of supporting 500 lbs or more.

Figure 4:
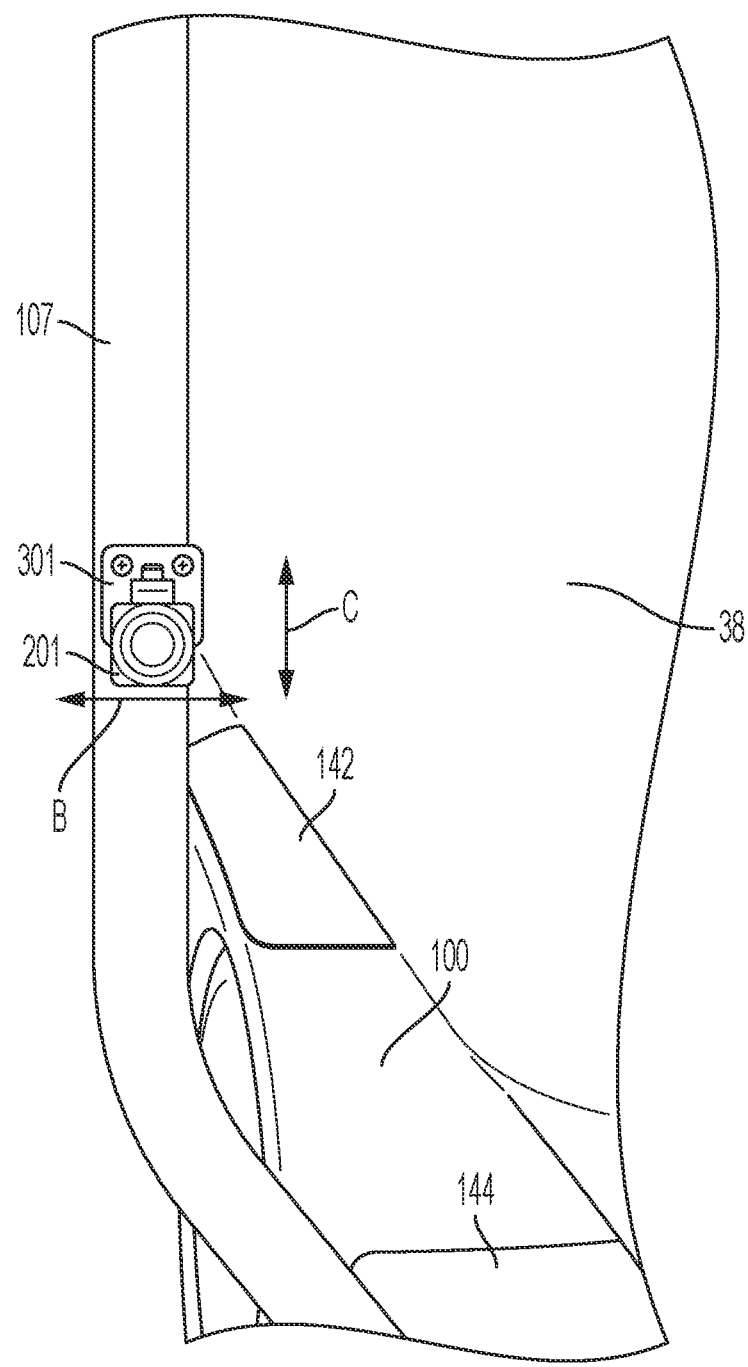
FIG. 4 is a detail view of the boat trailer of FIG. 2 from the rear looking forward and showing a camera and a mount of the trailer back-up system.

The trailer 100 also includes a left guide pole 107 and a right guide pole 109. The left guide pole 107 is located on the left side of the trailer 100 and, when the boat 20 is loaded on the trailer 100, is adjacent to the port side 38 of the hull 30 of the boat 20. The right guide pole 109 is located on the right side of the trailer 100 and, when the boat 20 is loaded on the trailer 100, is adjacent to the starboard side 36 of the hull 30 of the boat 20. Each of the left guide pole 107 and the right guide pole 109 extends in a generally vertical direction. As discussed above, the term "generally vertical" includes a direction normal to a horizontal surface of the trailer 100 (such as the step 144), and also includes other angles that are not normal to the horizontal surface such as for example, between 45 degrees to 135 degrees to the horizontal surface of the trailer 100. Such angles include guide poles 107, 109 extending at an angle in the left or right direction of the trailer 100 and/or extending at an angle in a forward or rearward direction of the trailer 100. In some embodiments each guide pole 107, 109 is rectilinear or curvilinear. In other embodiments, each guide pole 107, 109 has a compound shape. As shown in FIG. 4, for example, each guide pole 107, 109 may have a portion that is angled outward from the centerline of the trailer 100 and a more vertical portion above the portion that is angled outward.

The left and right guide poles 107, 109 are positioned on the frame 110 so that when a boat 20 is fully loaded onto the frame 110, the left and right guide poles 107, 109 are located closer to the stern 35 of the boat than to the bow 34 of the boat. The left guide pole 107 is positioned so that it is adjacent to the port side 38 of the hull 30 of the boat 20. The right guide pole 109 is positioned so that it is adjacent to the starboard side 36 of the hull 30 of the boat 20. When the boat 20 is fully loaded onto the trailer 100, there preferably is a gap between the hull 30 of the boat 20 and each of the left and right guide poles 107, 109.

The left and right guide poles 107, 109 are positioned on the rear portion 102 of the trailer 100 and preferably positioned closer to the rear-most end 103 of the trailer 100 than the front portion 101 of the trailer 100. In some embodiments, each of the guide poles 107, 109 is positioned between the rear-most tires 132, 133 and the rear-most end 103 of the trailer 100. In the trailer 100 shown in FIG. 2 the guide poles 107, 109 are proximal to the rear-most tires 132, 133 of the trailer 100 and, more specifically, closer to the rear-most tires 132, 133 than the rear-most end 103 of the trailer 100. In other embodiments the guide poles 107, 109 are proximate to the rear-most end 103 of the trailer 100, and more specifically, closer to the rear-most end 103 of the trailer 100 than the rear-most tires 132, 133.

Further details of the left guide pole 107 will be described below. This description applies equally to the right guide pole 109. The left guide pole 107 includes a bottom portion 151 and a top portion 153. The bottom portion 151 of the left guide pole 107 is connected to the frame 110 by a connection 157. In this embodiment, the connection 157 is a socket located in the step 144. The socket is configured to accept and secure the left guide pole 107. In some embodiments, the socket forms a removable connection that allows the left guide pole 107 to be removed when not in use. The left guide pole 107 may be further secured by a fastener, such as bolts, a weld, or the like. The connection 157 of this embodiment is formed in the step 144, which in turn is connected to the frame 110. However, other suitable connections 157 and configurations may be used. The socket may be attached to the frame 110, for example, by a fastener, such as bolts, or a weld. In addition, the connection 157 of the left guide pole 107 to the frame 110 may be a direct connection such as a fastener (e.g., bolts) fastening the left guide pole 107 to the frame 110, or a weld between the left guide pole 107 and the frame 110.

In some embodiments, each of the guide poles 107, 109 is at least as tall as the port side 38 and the starboard side 36 of the hull 30, and preferably taller than the port side 38 and the starboard side 36 of the hull 30. In some embodiments, each of the guide poles 107, 109 is positioned such that it extends beyond the width of the frame 110 of the trailer 100. Each of the guide poles 107, 109 includes a top end 153. Each of the guide poles 107, 109 has a height determined the rectilinear distance from the connection 157 to the top end 153. In this embodiment, the height of the left guide pole 107 is the distance from the surface of the step 144 to the top end 115 of the left guide pole 107.

The guide poles 107, 109 are positioned such that when the boat 20 is fully loaded onto the trailer 100, the guide poles 107, 109 are located such that they are spaced apart from each other by a distance larger than the largest beam width of the boat 20. Preferably, the guide poles 107, 109 are positioned directly across from each other such that they are the same distance in a forward direction from the rear-most end 103 of the trailer 100.

Figure 3:
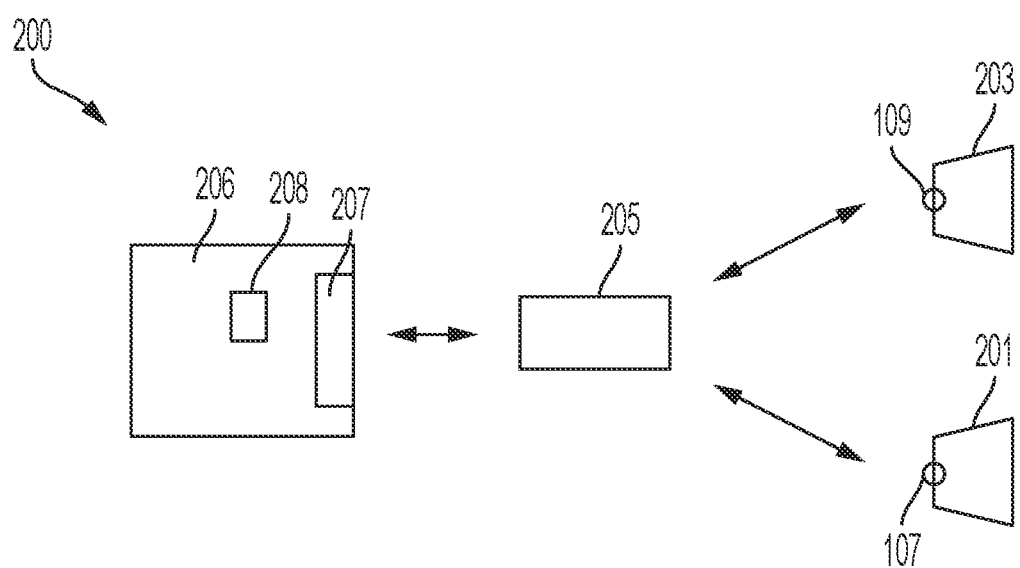
FIG. 3 is a schematic diagram of the trailer back-up system shown in FIG. 2.

As noted above and shown in FIG. 2, the trailer 100 is equipped with a trailer back-up system 200. FIG. 3 is a schematic of the trailer back-up system 200. The trailer back-up system 200 includes a first image capture device 201, mounted on the left guide pole 107 of the trailer 100 in a rear-facing direction, and a second image capture device 203, mounted on the right guide pole 109 of the trailer 100 in a rear-facing direction.

Each image capture device 201, 203 may be equipped to sense and image the environment on and/or around the trailer 100 and boat 20 by any suitable means. The image capture devices 201, 203 may include visual image sensors (e.g., cameras that sense visual light to create still images or video images) infrared image sensors, radar image sensors, etc. Each image capture device 201, 203 has a field of view, respectively, which is the area captured, or imaged, by the respective image capture device 201, 203. In the embodiments shown in the figures, the image capture devices 201, 203 are a pair of cameras. In some embodiments, the cameras 201, 203 are equipped to use infrared light for night vision. In some embodiments, the cameras 201, 203 are waterproof. The cameras 201,203 may have an Ingress Protection (IP) rating, as defined in international standard IEC 60529, suitable for the desired application. A non-limiting example of a suitable camera may be the VCMS50I made by ASA Electronics of Elkhart, Ind., which has an IP rating of IP69K. Such characteristics allow for use of the cameras 201, 203 and trailer back-up system 200 in situations of reduced light and allow for the trailer 100 to be lowered into a body of water without damage to the cameras 201, 203.

As noted above, the first image capture device 201 and the second image capture device 203 are mounted such that they each face in a rear direction. When the trailer back-up system 200 is in use, the first image capture device 201 is positioned to capture (i) at least a rear portion of a left side of the boat 20, (ii) at least an area adjacent to the rear portion of the left side of the boat 20, and (iii) an environment behind a left, rear corner of the boat 20. In this embodiment, the rear portion of the left side of the boat 20 is an aft portion of the port side 38 of the hull 30 of the boat 20, the area adjacent to the rear portion of the left side of the boat 20 is an area adjacent to the aft portion of the port side 38 of the hull 30 of the boat 20, and the environment behind a left, rear corner of the boat 20 is an environment behind a port, stern corner of the boat 20. Similarly, when the trailer back-up system 200 is in use, the second image capture device 203 is positioned to capture (i) at least a rear portion of a right side of the boat 20, (ii) at least an area adjacent to the rear portion of the right side the boat 20, and (iii) an environment behind a right, rear corner of the boat 20. In this embodiment, the rear portion of the right side of the boat 20 is an aft portion of the starboard side 36 of the hull 30 of the boat 20, the area adjacent to the rear portion of the right side of the boat 20 is an area adjacent to the aft portion of the starboard side 36 of the hull 30 of the boat 20, and the environment behind a right, rear corner of the boat 20 is an environment behind a starboard, stern corner of the boat 20.

As shown in FIG. 2, the image capture devices 201, 203 are positioned on the guide poles 107, 109 such that they capture a vertical and elevated view from the trailer 100. Relative to the boat 20 and as discussed above, each of the guide poles 107, 109 are at least as tall as the hull of the boat. In some embodiments, the first image capture device 201 is mounted on the left guide pole 107 at a position from the connection 157 in the vertical direction that is, preferably, one-quarter of the height or greater and, more preferably, one-third of the height or greater. In other embodiments, the first image capture device 201 is mounted on the left guide pole 107 at a position from the connection 157 in the vertical direction that is, preferably, three-quarters of the height or less and, more preferably, two-thirds of the height or less.

The first image capture device 201 also may be mounted on the left guide pole 107 at a position from the connection 157 in the vertical direction that is, preferably, between one-quarter and three-quarters of the height and, more preferably, between one-third and two-thirds of the height.

Similarly, the second image capture device 203 is mounted on the right guide pole 109 at a position from the connection 157 in the vertical direction that is, preferably, one-quarter of the height or greater and, more preferably, one-third of the height or greater. In other embodiments, the second image capture device 203 is mounted on the right guide pole 109 at a position from the connection 157 in the vertical direction that is, preferably, three-quarters of the height or less and, more preferably, two-thirds of the height or less. The second image capture device 203 is mounted on the right guide pole 109 at a position from the connection 157 in the vertical direction that is, preferably, between one-quarter and three-quarters of the height and, more preferably, between one-third and two-thirds of the height.

By positioning each of the image capture devices 201, 203 in such a manner, each of the image capture devices 201, 203 can provide an elevated view (see FIGS. 9A-9C and 10A-10B) simultaneously including a view of the side of the hull 30 of the boat 20, the bottom corners 56, 58 of the stern 35 of the boat 20, and the rear corners 156, 158 of the trailer 100. The bottom left corner 56 of the stern 35 of the boat 20 is located at the rearmost bottom corner of the port side 38 of the hull 30 of the boat 20, more specifically the port-side chine at the transom. The bottom right corner 58 of the stern 35 of the boat 20 is located at the rearmost bottom corner of the starboard side 36 of the hull 30 of the boat 20, more specifically the starboard-side chine at the transom. The rear left corner 156 of the trailer 100 is located on a left side of the rear portion 102 of the trailer 100. The rear right corner 158 of the trailer 100 is located on a right side of the rear portion 102 of the trailer 100. The location and orientation of the image capture devices 201, 203 in combination with the location of the guide poles 107, 109 allows for the image capture devices 201, 203 to capture the bottom rear corners of the boat 20 and trailer 100, the sides of the boat and trailer, and any obstacles next to or behind the boat 20 and trailer 100.

Figure 5:
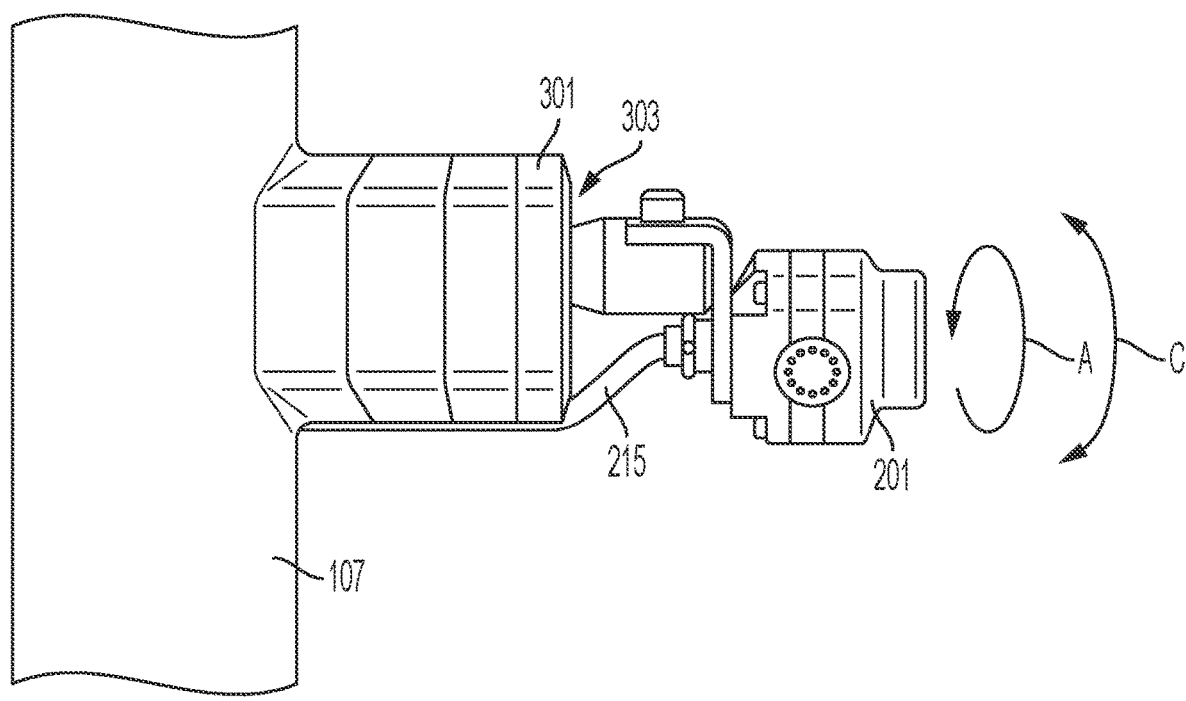
FIG. 5 is a side view of the camera and the mount of FIG. 4.

As noted above, the first and second image capture devices 201, 203 of the trailer back-up system 200 may be a pair of cameras. FIGS. 4 and 5, for example, show a camera as an image capture device 201 mounted on the left guide pole 107 of the trailer 100. FIG. 4 is a view from the back of the trailer 100 showing the camera 201 configured to face in a rear direction. FIG. 5 is a side view of the camera 201 and mount 301 of FIG. 4. The following description of the first image capture device 201 also applies to the second image capture device 203. In FIGS. 4 and 5, the camera 201 is mounted on the left guide pole 107 of the trailer 100 by a mount 301. Any suitable mount 301 may be used, but in this embodiment, the mount 301 includes a ball joint 303 to allow for movement of the camera 203 in a rotational direction A, a translational direction B, and/or a vertical direction C. The translational direction B in this embodiment is a left-right direction. As a ball joint 303 is used in this embodiment, both the translational direction B and the vertical direction C include components of a forward and back direction.

In some embodiments, as shown in FIG. 3, for example, the trailer back-up system 200 is configured to include an image processor 208 to allow the simultaneous display of content captured by the first image capture device 201 and content captured by the second image capture device 203 on a display device 206. The display device 206 may include the image processor 208. In such embodiments, the content from both image capture devices 201, 203 is simultaneously displayed on a split screen such that a user can view content broadcasted from each of the image capture devices 201, 203 at once (see for example FIGS. 9A-9C and 10A-10B).

The cameras 201, 203, are communicatively coupled to the display device 206. In this embodiment, the cameras 201, 203 are wirelessly coupled to the display device 206, but other suitable connections may be used, such as wired connections. Suitable connections include, for example, an electrical conductor, a low-level serial data connection, such as Recommended Standard (RS) 232 or RS-485, a high-level serial data connection, such as Universal Serial Bus (USB) or the Institute of Electrical and Electronics Engineers (IEEE) 1394, a parallel data connection, such as IEEE 1284 or IEEE 488, and/or a short-range wireless communication channel, such as BLUETOOTH, and/or wireless communication networks using radiofrequency signals, such as WiFi. When a wired connection and protocol is used, each of the cameras 201, 203 and the display device 206 may include a suitable port to support the wired connection. When a wireless protocol is used, each of the cameras 201, 203 and the display device 206 may include a transmitter and a receiver.

Figure 6:
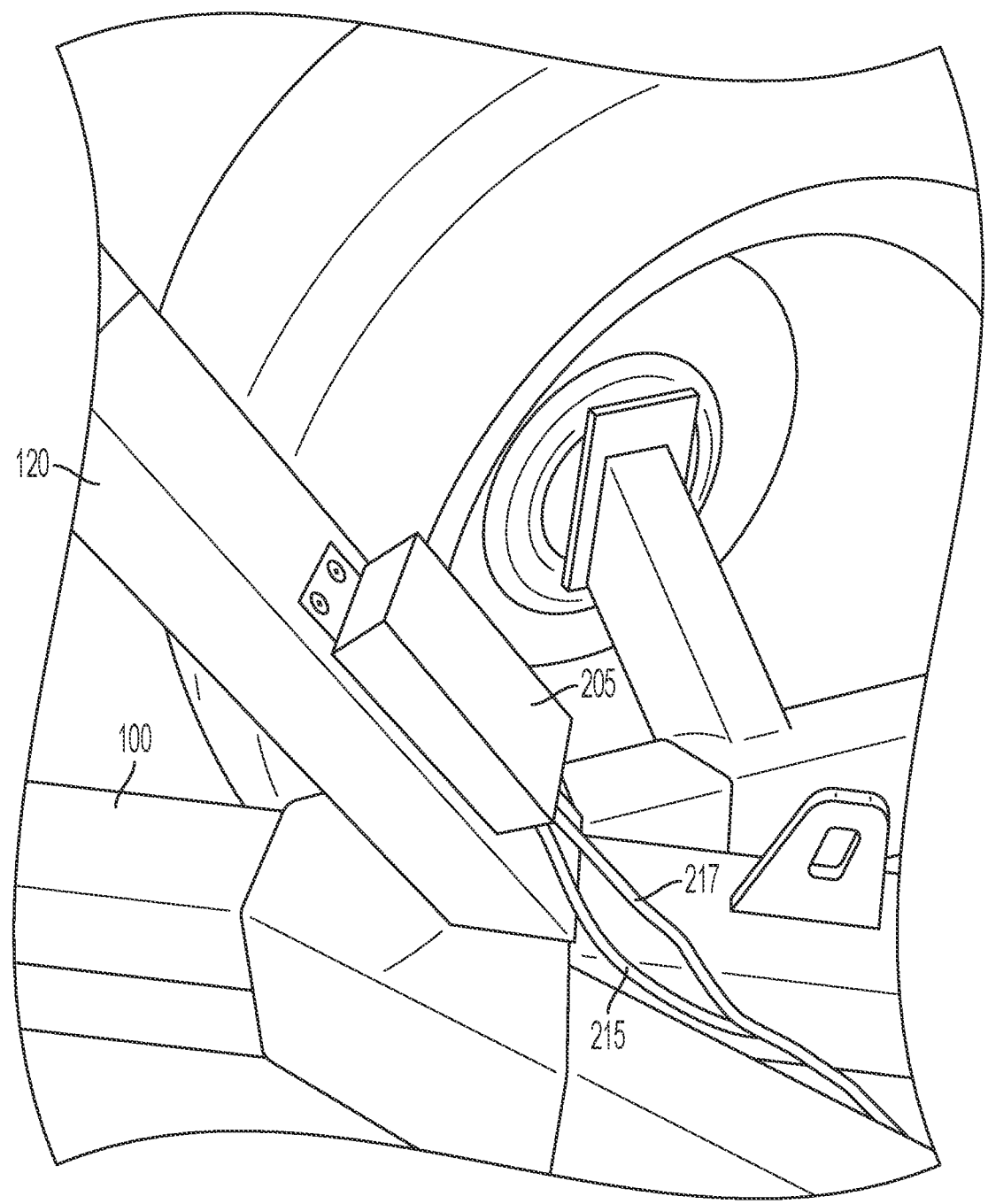
FIG. 6 is a detail view of the boat trailer of FIG. 2, showing a wireless transmitter of the trailer back-up system of FIGS. 2 and 3.

In this embodiment, the trailer back-up system 200 includes a wireless transmitter 205 mounted on the trailer 100 (see e.g., FIG. 6). The wireless transmitter 205 is in communication with each of the first image capture device 201 and the second image capture device 203. The wireless transmitter 205 is configured to process and broadcast live video images from the first image capture device 201 and from the second image capture device 203 to the display device 206. The trailer back-up system 200 includes a receiver 207 to receive and process the signal from the wireless transmitter 205. The receiver 207 is communicatively coupled to the display device 206 and in some embodiments may be part of the display device 206. Non-limiting examples of the display device 206 include a display screen in the vehicle 10, boat 20, or a mobile device, such as a phone.

Figure 7:
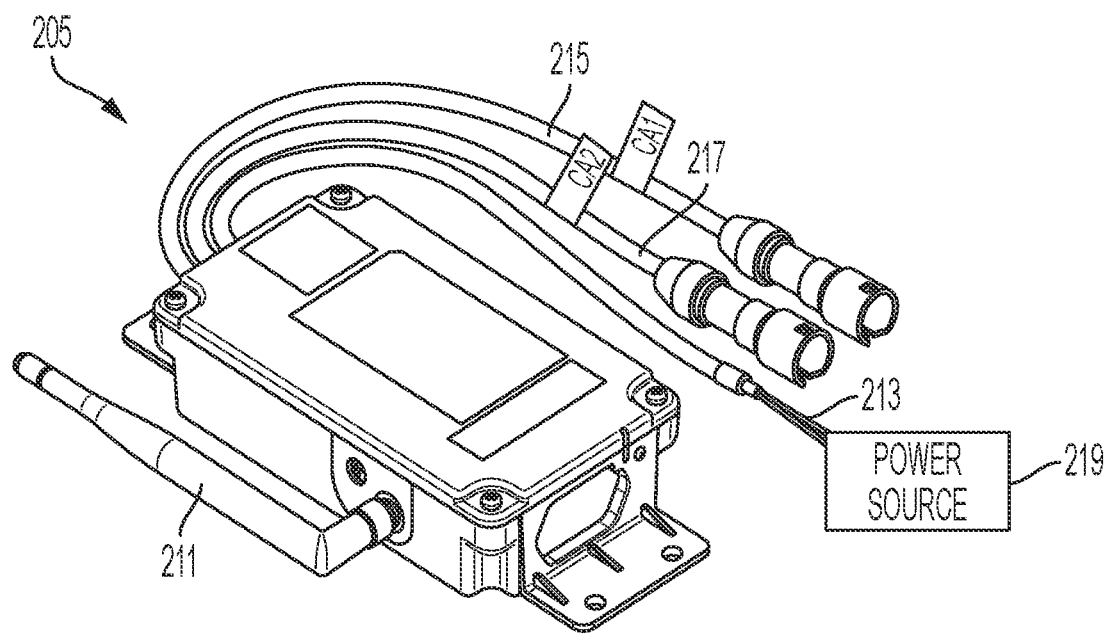
FIG. 7 shows the wireless transmitter of FIG. 6 unmounted from the boat trailer.

FIGS. 6 and 7 show an example of the wireless transmitter 205 that may be used in a trailer back-up system 200. As shown in FIG. 6, the wireless transmitter 205 is mounted on the winch post 120 of the trailer 100 in this embodiment. The wireless transmitter 205 is preferably mounted to the winch post 120 at the bottom portion of the winch post 120. The wireless transmitter 205 may, however, be mounted to the trailer 100 at any suitable location including other portions of the frame 110 of the trailer 100. As noted above, the wireless transmitter 205 is communicatively coupled to the image capture devices 201, 203. In this embodiment, the wireless transmitter 205 is communicatively coupled to the image capture devices 201, 203 by cables 215, 217 (see also FIGS. 5 and 7), respectively, but may be connected using other suitable wired or wireless connections, such as those discussed above. Suitable cables 215, 217 include coaxial cables, but, depending upon the connection, other cables may be used.

FIG. 7 is a schematic of the wireless transmitter 205 of FIG. 6. As noted above, the wireless transmitter 205 broadcasts live video images from the first image capture device 201 and from the second image capture device 203 to the display device 206. The wireless transmitter 205 has a Wi-Fi antenna 211 for broadcasting live images from the two cameras 201, 203 of the trailer back-up system 200 to a display device 206. The wireless transmitter 205 also has an electrical connection 213 configured to connect the wireless transmitter 205 to a power source 219. Non-limiting examples of a suitable power source 219 include a battery or an electrical system of the vehicle 10. In the example shown in FIG. 7, the wireless transmitter 205 is powered by the vehicle 10. The wireless transmitter 205 is also preferably waterproof, having, for example, an IP69K IP rating. The image capture devices 201, 203 are configured to connect to a power source, such as the power source 219.

Use of the trailer back-up system 200 is described in greater detail using the following examples. The image processor 208 is configured to allow a user to view simultaneously images from the two image capture devices 201, 203 on a split screen, as shown in these examples, but the invention is not so limited and the image processor 208 may be configured to allow a user to selectively view images from each of the image capture devices 201, 203 one at a time.

Figure 8:
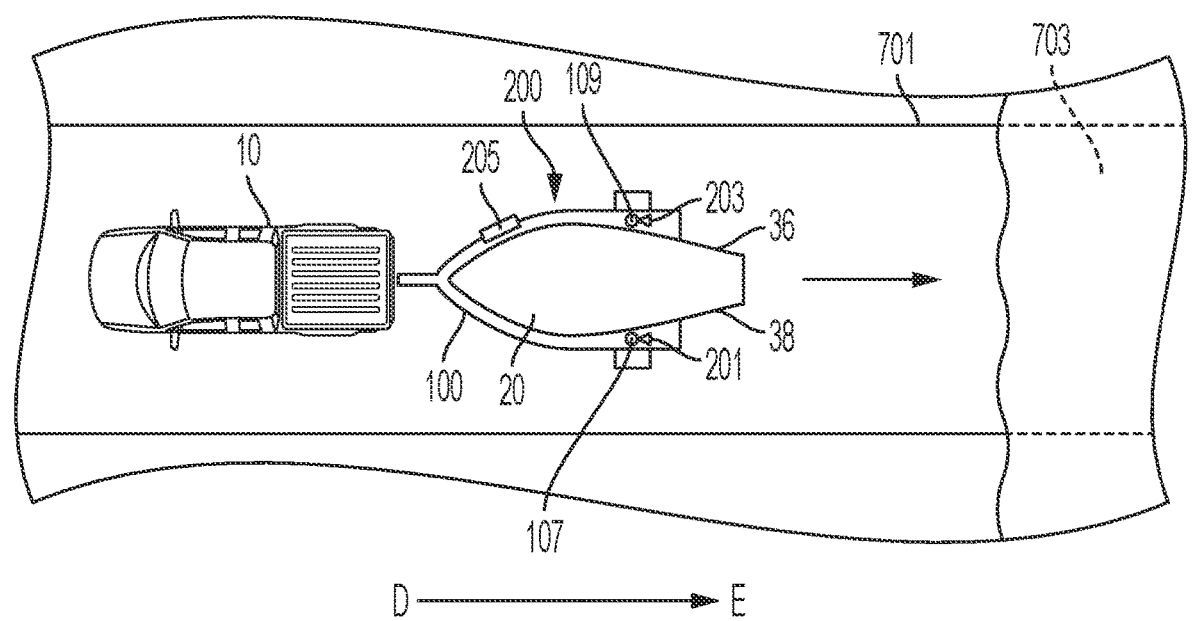
FIG. 8 is an overhead schematic showing the trailer back-up system of FIGS. 2 and 3 being used to launch the boat into a body of water.

FIG. 8 and FIGS. 9A-9C show use of the trailer back-up system 200 described above to launch the boat 20 into a body of water such as a lake 703. FIG. 8 is a schematic showing the vehicle 10 hitched to the trailer 100 carrying the boat 20 and lowering the boat 20 down a boat ramp 701 and into a lake 703. The general direction of the vehicle 10 and trailer 100 towards the lake 703 is denoted by arrow D➔E. The trailer 100 is equipped with the trailer back-up system 200 of FIGS. 2-7 described above.

Figure 9A:
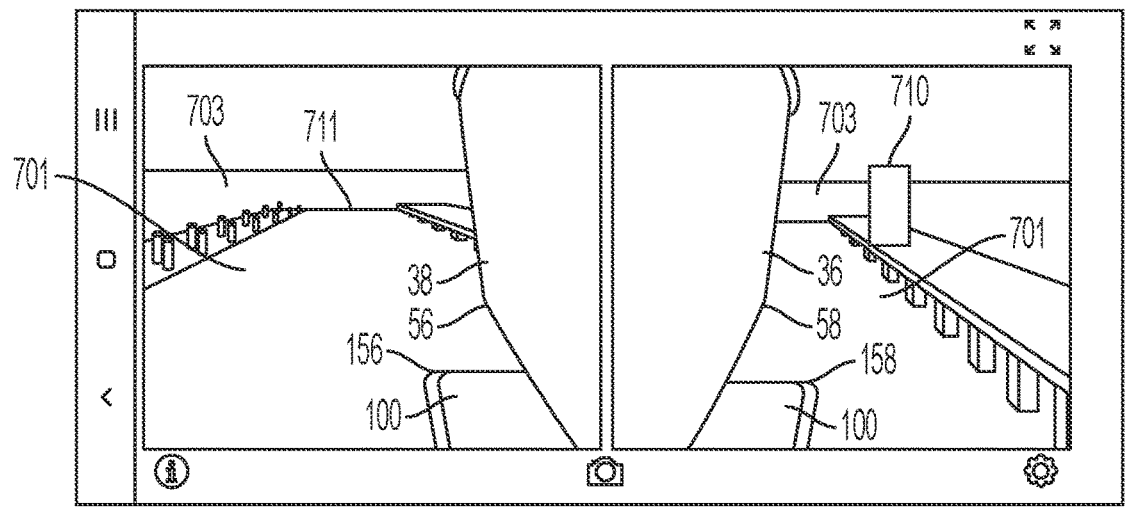
FIGS. 9A-9C show a series of images taken from the cameras of the trailer back-up system of FIGS. 2 and 3 during the process of launching the boat as depicted in FIG. 8.
Figure 9B:
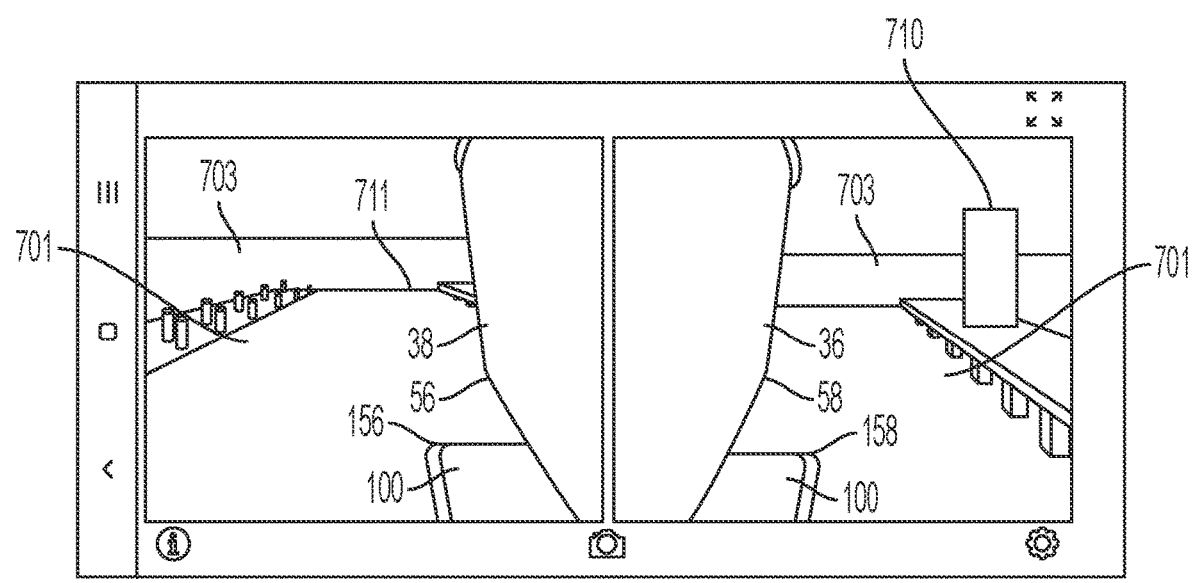
Figure 9C:
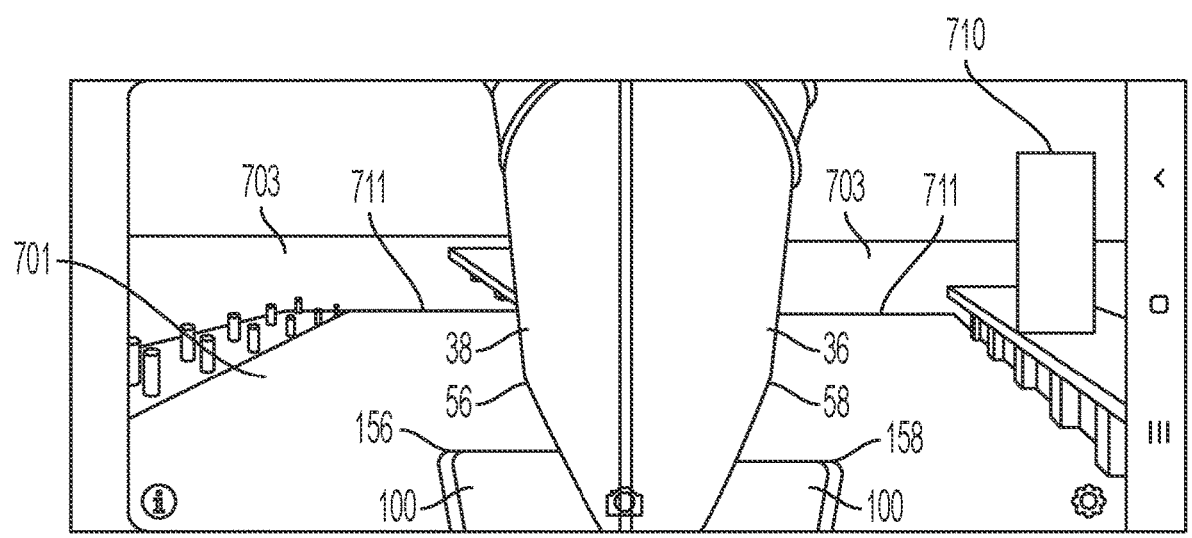

FIGS. 9A-9C show a series of images taken from the image capture devices 201, 203 of the trailer back-up system 200 of FIG. 8 as the boat 20 and trailer 100 are backed down the boat ramp 701 and into the lake 703. In FIGS. 9A-9C, views taken from the first camera 201 and the second camera 203 are displayed simultaneously on a spit-screen, with the image from one capture device (the first camera 201 or the second camera 203) on one side of the screen and the image from the other capture device (the first camera 201 or the second camera 203) on the opposite side of the screen. Any suitable arrangement may be used, and the hardware and software may enable these images to be switched and/or mirrored to show a desired output based on user preferences. In the embodiment shown in FIGS. 9A-9C, the left panel in each of FIGS. 9A-9C represents the view from the first camera 201, and the right panel in each of FIG. 9A-9C represents the view from the second camera 203.

In each of FIGS. 9A-9C, the view from the first camera 201 (left panel) provides a user (i) a view of the back end of the trailer 100 and the environment behind it; (ii) a portion of the port side 38 of the hull 30 of the boat 20 and the environment next to it; and (iii) the location of the bottom left corner 56 of the stern of the boat 20. The view offered by the first camera 201 allows the user to be aware of the location of the port side 38 of the hull 30 of the boat and the left side of the trailer 100 as well as obstacles adjacent to the port side 38 of the hull 30 of the boat 20 and immediately behind the trailer 100 as the boat 20 is backed up into the lake 703. At the same time, the view from the second camera 203 (right panel) provides a user (i) a view of the back end of the trailer 100 and the environment behind it; (ii) a portion of the starboard side 36 of the hull 30 of the boat 20 and the environment next to it; and (iii) the location of the bottom right corner 58 of the stern 35 of the boat 20. The view offered by the second camera 203 allows the user to be aware of the location of the starboard side 36 of the hull 30 of the boat 20 and the right side of the trailer 100 as well as obstacles adjacent to the starboard side 36 of the hull 30 of the boat 20 and immediately behind the trailer 100 as the boat 20 is backed up into the lake 703.

The ability to simultaneously see behind the boat 20 and trailer 100 as well as the areas adjacent to the hull of the boat 20 facilitates backing up of the boat 20 while avoiding obstacles in the environment that could cause damage to the boat 20 and/or that could be damaged by the boat 20. Also, the ability to see both bottom corners 56, 58 of the boat 20 and trailer in real-time is unique compared to known back-up systems, where any visual representation of the rear bottom corners of a vehicle or trailer are projections which predict a distance of an object from a bottom corner. Here, obstacles on the ramp 701 which might be behind or adjacent to the boat 20 are captured and displayed in real-time as the boat 20 is backed up, thus allowing one to see, in real-time, obstacles present behind or next to the boat 20 that might pose a threat as the boat 20 is backed into the lake 703. For instance, in FIGS. 9A-9C, a driver is able to see an object 710 in the distance (FIG. 9A), and gauge the proximity of the object 710 to the boat 20 as the boat 20 approaches the object 710 (FIG. 9B) and eventually passes the object 710 (FIG. 9C). This allows the driver to safely back up the boat 20 without contacting the object 710. In addition, the driver can at all times see the edge 711 of the ramp 701, thus facilitating the ability of the driver to safely gauge the remaining distance before the boat 20 has reached the lake 703.

FIG. 9A is a screenshot from a display device 206 showing the starting position of the vehicle 10, trailer 100, and boat 20. The screenshot depicts the view taken from the first camera 201 (left panel) and the second camera 203 (right panel).

FIG. 9B is a screenshot from the display device 206 taken as the vehicle 10, trailer 100, and boat 20 are moved down the boat ramp 701 and closer to the lake 703. The screenshot depicts the view taken from the first camera 201 (left panel) and the second image capture device 203 (right panel).

FIG. 9C is a screenshot from the display device 206 taken as the vehicle 10, trailer 100, and boat 20 are moved down the boat ramp 701 and to the edge of the lake 703. The screenshot depicts the view taken from the first camera 201 (left panel) and the second camera 203 (right panel).

In the example above, the trailer back-up system 200 is shown for use in lowering the boat 20 down a boat ramp and into a lake 703. However, the unique positioning of the image capture devices 201, 203 also allows for use of the trailer back-up system 200 to back the boat 20 and trailer 100 into a garage or parking space. Such applications are made possible because in addition to providing a user with a view of the environment immediately behind the boat 20 and trailer 100, the image capture devices 201, 203 also allow a user to view objects in the environment adjacent to the starboard side 36 and the port side 38 of the hull of the boat 20 in tow.

Figure 10A:
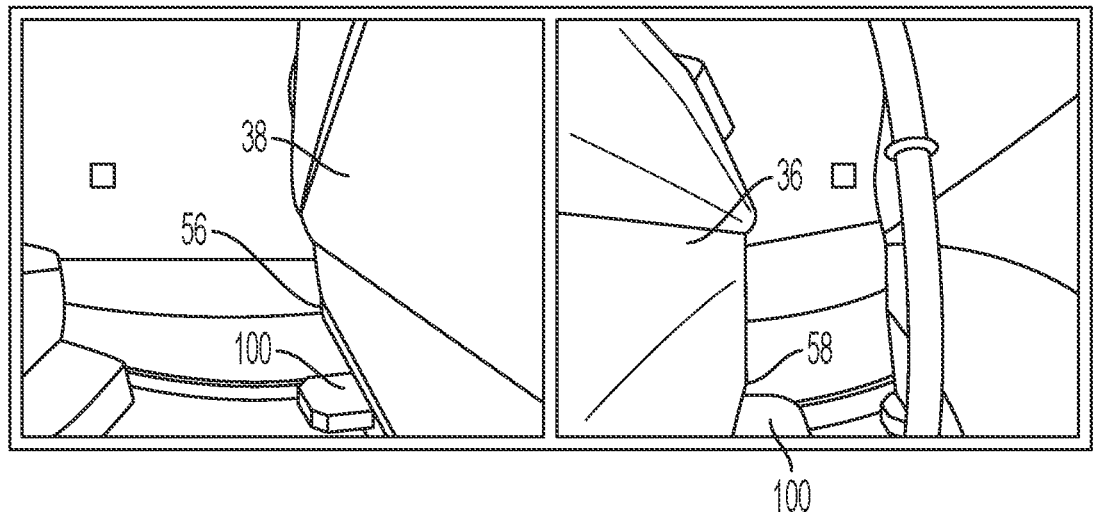
FIGS. 10A and 10B show images taken from the cameras of the trailer back-up system of FIGS. 2 and 3 during the process of parking the boat into a parking space.
Figure 10B:
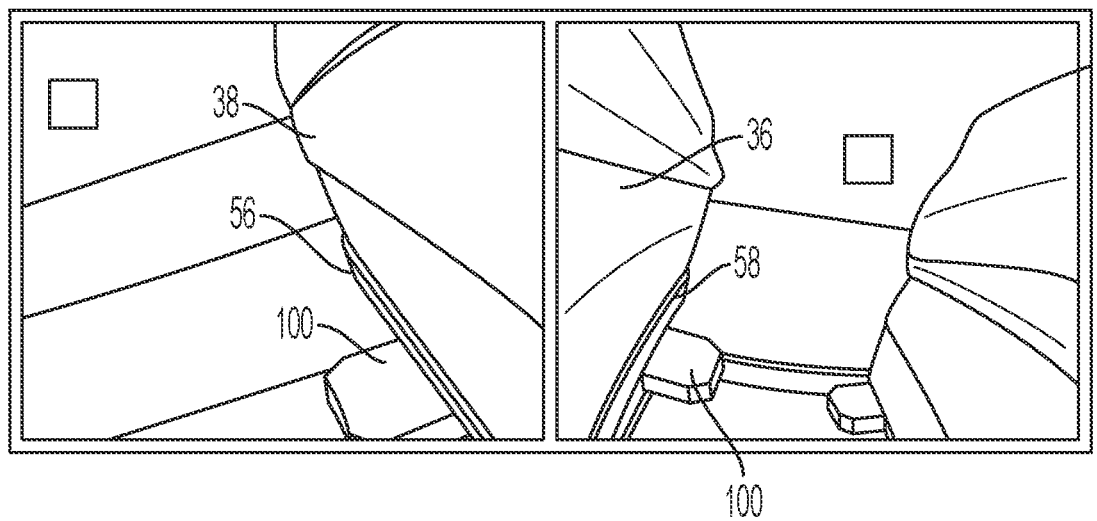

For example, FIGS. 10A and 10B show a series of images taken from the cameras 201, 203 of the trailer back-up system 200 of FIG. 8 as the boat 20 and trailer 100 are backed into a parking space. In FIGS. 10A and 10B, views taken from the first camera 201 and the second camera 203 are displayed simultaneously on a spit-screen. The left panel in each of FIGS. 10A and 10B represents the view from the first camera 201. The right panel in each of FIGS. 10A and 10B represents the view from the second camera 203.

From the combination of the views taken from each camera, the vehicle driver can simultaneously view (i) the back end of the trailer 100 and the environment behind it; (ii) a portion of the port side 38 of the hull 30 of the boat 20 and the environment next to it; (iii) the location of the bottom left corner 56 of the stern 35 of the boat 20; (iv) a portion of the starboard side 36 of the hull 30 of the boat 20 and the environment next to it; and (iv) the location of the bottom right corner 58 of the stern 35 of the boat 20. Such a simultaneous view allows the driver to see, in real-time, obstacles present behind or adjacent to the boat 20 that potentially could damage the boat 20. For example, as demonstrated in FIGS. 10A and 10B, the driver can simultaneously see the rear bottom corners 56, 58 of the stern 35 of the boat 20 as the boat 20 is moved into the parking space, as well as a vehicle adjacent to the port side 38 of the hull of the boat 20, and another boat adjacent to the starboard side 36 of the hull of the boat 20. Unlike known vehicle back-up cameras, which provide projections of the rear corners of the vehicle, the instant system provides for actual and real-time visibility of the rear corners 56, 58 of the stern 35 of the boat 20.

FIG. 10A is a screenshot from a display device showing the trailer 100 and boat 20 as they are being backed into a parking space. The screenshot depicts the view taken from the first camera 201 (left panel) and the second camera 203 (right panel).

FIG. 10B is a screenshot from the display device taken at the final parked position of the trailer 100 and boat 20 in the parking space. The screenshot depicts the view taken from the first camera 201 (left panel) and the second camera 203 (right panel).

In the instant system 200, the positioning of the cameras 201, 203 allows for a real-time view of the rear and rear corners of the boat 20 and trailer 100. By contrast, if the cameras 201, 203 were positioned on the side of the trailer 100 closer to the front portion 101 of the trailer 100, they would offer only a view of obstacles adjacent to the trailer 100 or boat 20. In such a configuration, a separate camera would have to be positioned at the rear of the trailer 100 to offer a view of obstacles behind the trailer 100 or boat 20. With such a configuration, a driver would not be able to see the corners of the boat 20 or trailer 100. Accordingly, the cameras 201, 203 of the instant system 200 are positioned closer to the rear of the trailer 100 than the front 101 of the trailer 100 and are not positioned farther forward than halfway between the rear 103 of the trailer 100 and the front 101 of the trailer 100.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A boat trailer comprising:
   a frame including a front portion and a rear portion, the rear portion having a rear left portion and a rear right portion;
   a left guide pole extending in a generally vertical direction and disposed on the rear left portion of the frame; and
   a right guide pole extending in a generally vertical direction and disposed on the rear right portion of the frame; and
   a trailer back-up system, including:
      a first image capture device mounted on the left guide pole of the trailer in a rear-facing direction;
      a first mount configured to mount the first image capture device to the left guide pole and configured to allow movement of the first image capture device in at least one of a rotational direction, a translational direction, and a vertical direction;
      a second image capture device mounted on the right guide pole of the trailer in a rear-facing direction;
      a second mount configured to mount the second image capture device to the right guide pole and configured to allow a movement of the second image capture device in at least one of a rotational direction, a translational direction, and a vertical direction; and
      a transmitter mounted on the frame of the trailer, the transmitter being in communication with each of the first image capture device and the second image capture device, the transmitter being configured to transmit live video images from the first image capture device and from the second image capture device to a display device.

2. The boat trailer of claim 1, wherein the first image capture device is mounted on the left guide pole such that, when a boat is loaded on the boat trailer, the first image capture device is positioned to capture (i) at least an aft portion of a port side of a hull of the boat, (ii) at least an area adjacent to the aft portion of the port side of the hull of the boat, and (iii) an environment behind a port, stern corner of the boat, and
   wherein the second image capture device is mounted on the right guide pole such that, when a boat is loaded on the boat trailer, the second image capture device is positioned to capture (i) at least an aft portion of a starboard side of a hull of the boat, (ii) at least an area adjacent to the aft portion of the starboard side of the hull of the boat, and (iii) an environment behind a starboard, stern corner of the boat.

3. The boat trailer of claim 1, wherein each of the left guide pole and the right guide pole includes (i) a top end, (ii) a bottom portion connected to the frame by a connection, each of the left guide pole and the right guide pole having a height that is a vertical distance from the connection to the top end, and
   wherein the first image capture device is mounted on the left guide pole at a position from the connection in the vertical direction that is one quarter of the height or greater, and
   wherein the second image capture device is mounted on the right guide pole at a position from the connection in the vertical direction that is one quarter of the height or greater.

4. The boat trailer of claim 3, wherein the first image capture device is mounted on the left guide pole at a position from the connection in the vertical direction that is three quarters of the height or less, and
   wherein the second image capture device is mounted on the right guide pole at a position from the connection in the vertical direction that is three quarters of the height or less.

5. The boat trailer of claim 1, wherein the first mount is configured to allow movement of the first image capture device in each of the rotational direction, the translational direction, and the vertical direction; and
   wherein the second mount is configured to allow a movement of the second image capture device in each of the rotational direction, the translational direction, and the vertical direction.

6. The boat trailer of claim 5, wherein each of the first mount and the second mount comprises a ball joint.

7. The boat trailer of claim 1, wherein the each of the first image capture device and the second image capture device are waterproof.

8. The boat trailer of claim 1, wherein each of the first image capture device and the second image capture device is equipped to use infrared light for night vision.

9. The boat trailer of claim 1, wherein the frame further comprises a winch post disposed on the front portion of the frame, and the transmitter is mounted on the winch post of the trailer.

10. The boat trailer of claim 1, wherein the transmitter is a wireless transmitter.

11. The boat trailer of claim 1, further comprising:
a left wheel on the rear left portion of the trailer;
a right wheel on the rear right portion of the trailer; and
a rear-most end of the trailer,
wherein the left guide pole is located between the left wheel and the rear-most end of the trailer, and
wherein the right guide pole is located between the right wheel and the rear-most end of the trailer.

12. The boat trailer of claim 1, wherein each of the left and right guide poles extends in the generally vertical direction beyond a width of the frame of trailer.

13. A method of backing up a boat on a trailer comprising:
moving the trailer with a boat loaded on the trailer in a rearward direction;
capturing, in real-time, a first view with a first image capture device, the first view comprising (i) at least a rear portion of a left side of the boat, (ii) at least an area adjacent to the left portion of the left side of the boat, and (iii) an environment behind a left, rear corner of the boat, the first image capture device being adjustably mounted to the trailer by a first mount configured to allow movement of the first image capture device in at least one of a rotational direction, a translational direction, and a vertical direction;
capturing, in real-time, a second view with a second image capture device, the second view comprising (i) at least a rear portion of a right side of the boat, (ii) at least an area adjacent to the rear portion of the right side of the boat, and (iii) an environment behind a right, rear corner of the boat, the second image capture device being adjustably mounted to the trailer by a second mount configured to allow movement of the first image capture device in at least one of a rotational direction, a translational direction, and a vertical direction; and
displaying on a display at least one of the first view and the second view in real-time.

14. The method of claim 13, wherein the first image capture device is mounted on a left guide pole of the trailer in a rear-facing direction to capture the first view; and
wherein the second image capture device is mounted on a right guide pole of the trailer in a rear-facing direction to capture the second view.

15. The method of claim 14, further comprising transmitting to the display device the first view and the second view with a transmitter mounted on a frame of the trailer and communicatively coupled to each of the first image capture device and the second image capture device.

16. The method of claim 15, wherein the transmitter is a wireless transmitter.

17. The method of claim 13, wherein the first view and the second view are simultaneously displayed on a split screen of the display device.

18. The method of claim 13, wherein, in the first view, the rear portion of the left side of the boat is an aft portion of a port side of a hull of the boat, the area adjacent to the left portion of the left side of the boat is an area adjacent to the aft portion of the port side of the hull of the boat, and the environment behind a left, rear corner of the boat is an environment behind a port, stern corner of the boat, and
wherein, in the second view, the rear portion of a right side of the boat is an aft portion of a starboard side of a hull of the boat, the area adjacent to the rear portion of the right side of the boat is an area adjacent to the aft portion of the starboard side of the hull of the boat, and the environment behind a right, rear corner of the boat is an environment behind a starboard, stern corner of the boat.

19. The method of claim 13, wherein the first mount is configured to allow movement of the first image capture device in each of the rotational direction, the translational direction, and the vertical direction; and
wherein the second mount is configured to allow a movement of the second image capture device in each of the rotational direction, the translational direction, and the vertical direction.

20. The method of claim 14, wherein each of the first mount and the second mount comprises a ball joint.

* * * * *